(12) United States Patent
Lindenberg et al.

(10) Patent No.: US 11,906,065 B2
(45) Date of Patent: Feb. 20, 2024

(54) ELECTRIC VALVE

(71) Applicant: Mahle International GmbH, Stuttgart (DE)

(72) Inventors: Matthias Lindenberg, Stuttgart (DE); Jeffrey Van Delden, Stuttgart (DE); Florian Wetzel, Baltmannsweiler (DE)

(73) Assignee: Mahle International GmbH (DE)

( * ) Notice: Subject to any disclaimer, the term of this patent is extended or adjusted under 35 U.S.C. 154(b) by 147 days.

(21) Appl. No.: 17/540,228

(22) Filed: Dec. 1, 2021

(65) Prior Publication Data

US 2022/0178458 A1 Jun. 9, 2022

(30) Foreign Application Priority Data

Dec. 3, 2020 (DE) .................. 102020215270.5

(51) Int. Cl.
*F16K 27/02* (2006.01)
*F25B 41/35* (2021.01)

(52) U.S. Cl.
CPC ............ *F16K 27/029* (2013.01); *F25B 41/35* (2021.01)

(58) Field of Classification Search
CPC ... F16K 27/029; F16F 1/324; F16F 2238/022; F16F 1/445; F16F 1/34; F25B 41/35
See application file for complete search history.

(56) References Cited

U.S. PATENT DOCUMENTS

| 2,843,350 A | 7/1958 | Wilson | |
|---|---|---|---|
| 2006/0062505 A1* | 3/2006 | Hoefs | H02K 7/083 384/517 |
| 2015/0275962 A1* | 10/2015 | Sakon | F16C 25/083 384/517 |
| 2019/0101179 A1* | 4/2019 | Schmidt | G05D 7/0635 |

FOREIGN PATENT DOCUMENTS

| DE | 102014113126 A1 | 3/2016 | |
|---|---|---|---|
| DE | 102018132022 A1 | 6/2020 | |
| DE | 102019206197 A1 | 11/2020 | |
| EP | 3 392 538 A1 | 10/2018 | |
| EP | 3392538 A1 * | 10/2018 | ............ F16K 31/04 |
| JP | 2003042325 A * | 2/2003 | |
| JP | 20030042325 A | 2/2003 | |
| JP | 2013164124 A | 8/2013 | |

OTHER PUBLICATIONS

German Search Report dated Dec. 3, 2021 for copending German Patent App. No. DE 102020215270.5.

\* cited by examiner

*Primary Examiner* — Schyler S Sanks

(74) *Attorney, Agent, or Firm* — Fishman Stewart PLLC

(57) ABSTRACT

An electric valve may include an electric machine having a rotor and a stator, a valve body drivingly connected to the rotor, a valve seat cooperating with the valve body, a housing in which the rotor and the stator are arranged, a split pot arranged in the housing and fluidically separating a dry region from a wet region in the housing, and a spring assembly including at least one spring. The rotor may be arranged in the split pot. The stator may surround the split pot radially on an outside in a circumferential direction. The split pot may protrude beyond an axially outer front side of the rotor. The spring assembly may be coupled to the housing and may rest on the front side spaced apart from the housing such that the spring assembly mechanically impinges on the stator radially and axially.

20 Claims, 6 Drawing Sheets

ELECTRIC VALVE

CROSS-REFERENCE TO RELATED APPLICATIONS

This application claims priority to German Patent Application No. DE 10 2020 215 270.5, filed on Dec. 3, 2020, the contents of which is hereby incorporated by reference in its entirety.

TECHNICAL FIELD

The present invention relates to an electric valve, in particular an electric expansion valve, for expanding a fluid, in particular in a thermodynamic cycle, which has an electric machine, a valve body, as well as a valve seat.

BACKGROUND

Electric valves are electrically operated valves, which are used in particular as electric expansion valve for expanding a fluid. Valves are often used in a thermodynamic cycle, for example in an air conditioning system, in order to expand a fluid, which circulates through the cycle, for example a coolant. The expansion usually takes place via the adjustment of a corresponding cross section, which can be flown through, and/or of a flow resistance for the fluid in the valve. It is desirable thereby to be able to change the flow, in particular the expansion attained by means of the valve, as needed. For this purpose, electric valves usually have an electric machine comprising a rotor and a stator, which cooperates with the rotor during operation. The rotor is generally connected in a rotationally fixed manner to a valve body of the valve, which cooperates with a valve seat for the adjustable expansion of the fluid.

Such an electric valve is known from EP 3 392 538 A1. The valve has a housing, in which the electric machine and the valve body are received. A split pot, which fluidically separates two different regions from one another within the housing, which can serve as dry region and wet region during operation, is further arranged in the housing. The rotor is arranged in the split pot. In contrast, the stator is arranged outside of the split pot and surrounds the split pot radially on the outside in a circumferential direction. The split pot protrudes beyond an axially outer front side of the rotor.

The fixation of the stator in the housing takes place via a radial abutment of the stator against the split pot on the outside as well as an axial screwing of the stator into the housing.

It is disadvantageous in the case of electric valves known from the prior art that a relative movement of the stator within the housing occurs during operation and with the aging of the electric valve. This in particular has an impact on the cooperation of the stator with the rotor, so that the precision ultimately decreases during operation of the valve.

SUMMARY

The present invention thus deals with the object of specifying an improved or at least another embodiment for an electric valve of the above-mentioned type, which is characterized in particular by a precision, which is increased over the service life, and/or a simplified production.

This object is solved according to the invention by means of the subject matter of independent claim(s). Advantageous embodiments are the subject matter of the dependent claim(s).

The present invention is based on the general idea of fixing the stator in the housing by means of a spring assembly, which has at least one spring, in an electric valve, which has an electric machine comprising a rotor arranged within a split pot, and a stator arranged outside of the gap, in that the spring assembly acts axially and radially on a front side of the stator. The use of a screw connection for fixing the stator in the housing becomes superfluous in this way. As a result, the high losses of the pre-tensioning force of the screw connection, which are associated with a screw connection and which occur in particular as a result of aging, due to thermal expansions, and the placement in the valve resulting therefrom, in particular in the housing, are avoided or at least reduced.

It is therefore preferred when the stator is fixed to the housing in a manner, which is free from screw connections. The use of the spring assembly further makes it possible to compensate thermal changes occurring during operation. Age-related structural changes in the valve, in particular in the housing, can likewise be compensated by means of the spring assembly. As a result, a desired positioning of the stator in the housing is achieved during the operation of the valve and over an extended service life. As a result, the valve can be operated in a precise manner during the operation and over a longer service life. In addition, the valve can be produced in a simplified manner due to the elimination or at least the reduction of screw connections for fixing the stator.

According to the idea of the invention, the electric valve has the electric machine, which has the rotor and the stator, which cooperates with the rotor in a known manner. The rotor is drivingly connected to a valve body of the valve, wherein the valve body cooperates with a valve seat. The valve further comprises the housing, in which the rotor and the stator are arranged. The split pot is arranged in the housing, wherein the split pot fluidically separates a first region from a second region within the housing. The first region is arranged radially on the inside, and the second region is arranged radially on the outside. One of the regions thereby serves as dry region, and the other region as wet region. The rotor is arranged in the split pot, whereas the stator is arranged outside of the split pot. The stator thereby surrounds the split pot and thus the rotor radially on the outside in a circumferential direction. The stator has an axially outer front side, beyond which the split pot protrudes. According to the invention, the valve has a spring assembly, which comprises at least one spring and which is fixed to the housing and which rests on the front side of the stator spaced apart from the housing, so that the spring assembly mechanically impinges on the stator radially and axially by means of the front side.

The impingement on the stator by means of the spring assembly radially and axially means in particular that the spring assembly resiliently impinges on the stator radially and axially by means of the front side. This means that the stator is resiliently pre-tensioned radially and axially by means of the spring assembly.

The present specified directions refer in particular to the extension of the rotor. The axial direction as well as axially thus correspond to a longitudinal extension of the rotor or of an axis of rotation of the rotor, respectively. The radial direction or radially, respectively, therefore runs transversely to the axial direction, and the circumferential runs so as to surround or enclose, respectively, the axial direction.

The drive connection of the valve body to the rotor is advantageously achieved by means of a rotationally fixed connection of the valve body to the rotor. The valve body is advantageously arranged on the end of the rotor, which is axially spaced apart from the split pot. It is conceivable in particular to form the valve body in one piece with the rotor.

Advantageously, the electric valve is an electric expansion valve, and is used to expand a fluid, in particular in a thermodynamic cycle, for example in an air conditioning system. The cooperation of the valve body and of the valve seat takes place for expanding the fluid. For example, a flow resistance for the fluid and/or a cross section, which can be flown through, for the fluid is thereby created by means of the cooperation of valve body and valve seat, so that the fluid expands. The cooperation of the valve body with the valve seat is thereby advantageously varied by means of the electric machine. It is conceivable in particular to vary the flow resistance and/or the cross section, which can be flown through, by means of the electric machine.

The housing preferably has a housing pot and a housing cover, which closes the housing pot, wherein the split pot is arranged in the housing pot. On the side, which axially faces the housing cover, the split pot preferably has a pot base.

In the case of preferred embodiments, the spring assembly has an opening, through which the split pot protrudes axially, preferably in the direction of the housing cover.

In the case of preferred embodiments, the spring assembly has a base portion resting on the front side as well as two wings, which stick out from the base portion radially on the outside and which are located on opposite sides. This means that the spring assembly has the base portion, which rests on the front side and has the two wings, which are arranged radially on opposite sides and which in each case stick out from the base portion radially on the outside. The respective wing is thereby fixed to the housing spaced apart from the base portion. The spring assembly preferably has only two wings. It is in particular preferred when the base portion rests flat on the front side. A dependence of the spring force, which results from the spring assembly, on the stressing of the spring assembly is reduced in this way. In other words, a flat rise occurs in a force-displacement curve associated with the spring assembly by means of such a formation of the spring assembly. A specified and desired impingement on the stator can thus be attained by means of the spring assembly, independently of the installation position of the spring assembly in the housing or at least with a reduced dependence of the installation position. In the case of a simple production of the valve, this results in an increased precision over an extended service life.

It is preferred when the housing for the respective wing has a corresponding receptacle, advantageously in the manner of a slot. The respective wing thereby preferably engages with an end region, which is spaced apart from the base portion, with the receptacle, in particular with the slot. A simple production of the valve with simultaneously desired impingement on the stator can thus be attained.

The receptacle or the slots, respectively, are thereby advantageously arranged in a radial outer wall of the housing pot on the radially inner side, and preferably run at an incline to the axial direction. The radial and axial impingement on the stator can thus be attained in a simple manner.

Embodiments are considered to be advantageous, in the case of which at least one of the wings, preferably the respective wing, has a radially inner inner portion, which is connected to the base portion and which is directed away from the front side, and a radially outer outer portion, which is fixed to the housing and which is directed away from the front side, which are connected to one another via at least one curved bending portion of the wing. The inner portion and the outer portion thereby advantageously run at an incline to the axial direction and are connected to one another via the at least one bending portion. This in particular has the result that a length of the wing is enlarged. When the wing is stressed, a local material stress is thus reduced. This results in an avoidance of plastic deformations of the wing or at least a reduction of plastic deformations of this type. As a result, a constant impinging on the front side of the stator is realized over a longer service life by means of the spring assembly.

Embodiments are thereby particularly preferred, in the case of which at least one of the wings, preferably the respective wing, has two such bending portions, which connect the inner portion to the outer portion. An S-shaped formation of the wing thereby results in an axial cross section of the wing, which leads to a particularly advantageous reduction of the local stress on the wing as well as to a particularly advantageous radial and axial mechanical impinging on the front side.

It is advantageous when the opening is formed in the base portion. This means that the base portion has the inner surface, which limits the opening. In particular a simplified production of the spring assembly as well as of the valve is thus attained.

In the case of preferred embodiments, the spring assembly, preferably spaced apart from the at least one wing, acts on the split pot, in order to impinge radially, preferably also axially, on the split pot. A positive connection is thereby preferably also realized between the split pot and the spring assembly.

In advantageous embodiments, the spring assembly has at least one tongue, which preferably sticks out from the base portion, for impinging on the split pot. The at least one tongue rests on the radial outer sleeve of the split pot, in order to radially, preferably also axially impinge on the split pot. The at least one tongue is preferably spaced apart from the at least one wing.

Embodiments are preferred, in the case of which at least one of the at least one tongue, advantageously the respective tongue, engages with an outer edge with the outer sleeve of the split pot, in order to form a positive connection with the split pot. On its side facing the split pot, the tongue thus has such an edge.

The respective at least one tongue is advantageously arranged in the region of the opening of the spring assembly. In particular, the at least one tongue is arranged so as to axially adjoin the opening.

Embodiments are thereby considered to be advantageous, in the case of which at least one of the at least one tongue sticks out axially and runs transversely to the radial direction. The tongue thus advantageously has a conical course. This leads to advantageous spring properties and additionally simplifies the penetration of the corresponding edge into the outer sleeve of the split pot.

The spring assembly advantageously has two such tongues, which are arranged radially on opposite sides. An even impinging on the split pot thus takes place. The tongues are preferably arranged offset to the at least one wing in the circumferential direction.

On principle, the spring assembly can have two or more springs. This means that the spring assembly can have two springs, which are separate from one another and which are spaced apart from one another.

It is particularly preferred when the spring assembly has only a single spring, which in particular has the base portion as well as the at least one wing, optionally additionally the at least one tongue.

At least one of the at least one spring, in particular the only spring, is advantageously made of a sheet metal part, thus in particular a sheet metal spring An advantageous mechanical impinging on the stator and/or on the split pot results in that due to the installation in the housing, that is, due to mechanical tensioning, the opening has a circular shape, which is at hand in the untensioned state of the spring assembly. In other words, the opening is formed to be non-round or elliptical, respectively, in an untensioned state of the spring assembly in an axial top view, whereas a deformation of the spring assembly takes place due to the insertion of the spring assembly in the valve and thus due to the impinging on the front side in such a way that the opening has a circular shape in the top view. In response to the tensioning of the spring assembly in the housing, in particular the at least one bending portion of the at least one wing is formed. This results in a simplified production of the spring assembly as well as in a simplified use of the spring assembly in the valve. In addition, increased tolerances are thus permissible.

The valve advantageously comprises a sensor means for determining the rotational position of the rotor and thus for determining the position of the valve body.

The sensor means preferably comprises a permanent magnet, which is arranged in the split pot and which is connected in a rotationally fixed manner to the rotor, as well as a magnetic sensor arranged outside the split pot. The magnetic sensor is advantageously arranged on the side of the split pot, which faces axially away from the permanent magnet. The sensor means further comprises a printed circuit board, to which the magnetic sensor is attached, preferably on the side of the printed circuit board, which faces the permanent magnet.

The printed circuit board is advantageously fixed in the housing via at least one tab, which sticks out from the spring assembly, preferably from the base portion. The at least one tab thus sticks out on the side of the spring assembly, which faces away from the front side, in particular of the base portion. The at least one tab thereby laterally engages around the printed circuit board and thus fixes the printed circuit board in the housing. It is advantageous thereby when the at least one tab is arranged offset to the wings in the circumferential direction. A more precise positioning of the printed circuit board and thus of the magnetic sensor to the stator and to the rotor and therefore also to the permanent magnet takes place due to the fixing of the printed circuit board by means of the at least one tab. The rotational position of the rotor and thus the position of the valve body can therefore be determined in a simpler and simultaneously more precise manner.

On principle, the tab can be a component, which is separate from the spring assembly and which is attached to the spring assembly.

It is also conceivable to form at least one of the at least one tab, advantageously the respective tab, in one piece with the spring assembly, that is, to in particular mold it onto the spring assembly. The production of the valve is thus simplified and the relative positioning of the printed circuit board to the spring assembly and thus to the stator is more precise.

The spring assembly preferably has at least two tabs, wherein one of the tabs acts on the side of the printed circuit board, which axially faces the front side, and the other tab acts on the side of the printed circuit board, which faces axially away from the front side. The tabs thus laterally engage around the printed circuit board and fix the latter. The tabs are thereby preferably arranged adjacent to one another, in particular so as to adjoin one another.

Advantageously, the tabs are part of a tab group. For the corresponding tabs, the tab group has a common base, which sticks out, and from which the tabs stick out.

Embodiments are considered to be preferred, in the case of which the spring assembly has three tabs, preferably of one tab group, in the manner of a fork. Two outer ones of the tabs thereby act on the side of the printed circuit board, which faces away from the front side, and a middle tab, which is arranged between the outer tabs, acts on the side of the printed circuit board, which faces the front side. A 3-point tensioning of the printed circuit board is created in this way. A reliable fixation of the printed circuit board and simultaneously an advantageous compensation of relative movements result therefrom.

The valve, which is formed as expansion valve, can be used to expand any fluid. The expansion valve is used in particular in a thermodynamic cycle, in which the expansion of a fluid, which circulates in the cycle, is necessary.

For example, the use of the valve in an air conditioning system, through which a coolant circulates, is conceivable. The coolant is thereby expanded during operation by means of the expansion valve.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations, or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
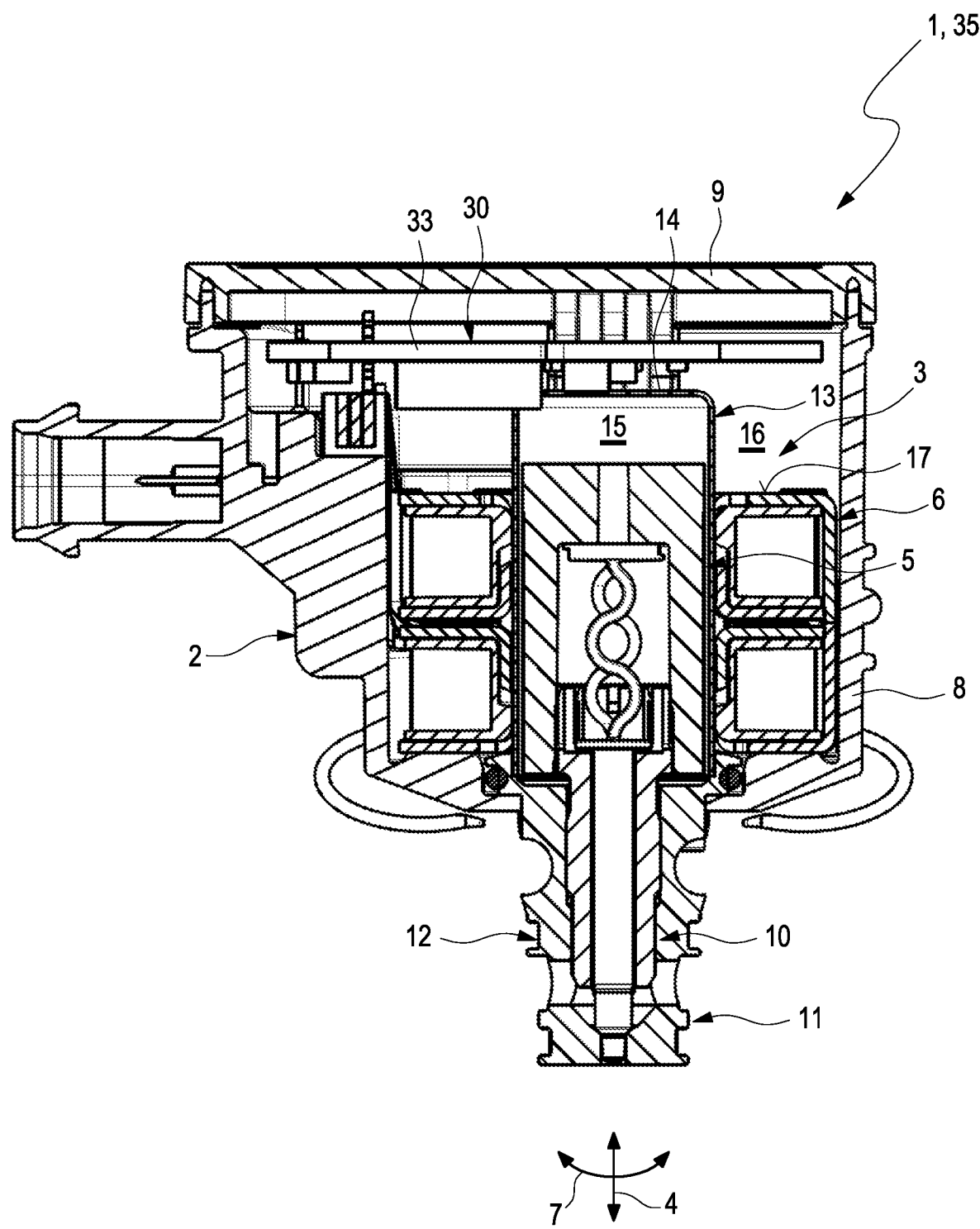
FIG. 1 shows an axial section through an electric valve.
Figure 2:
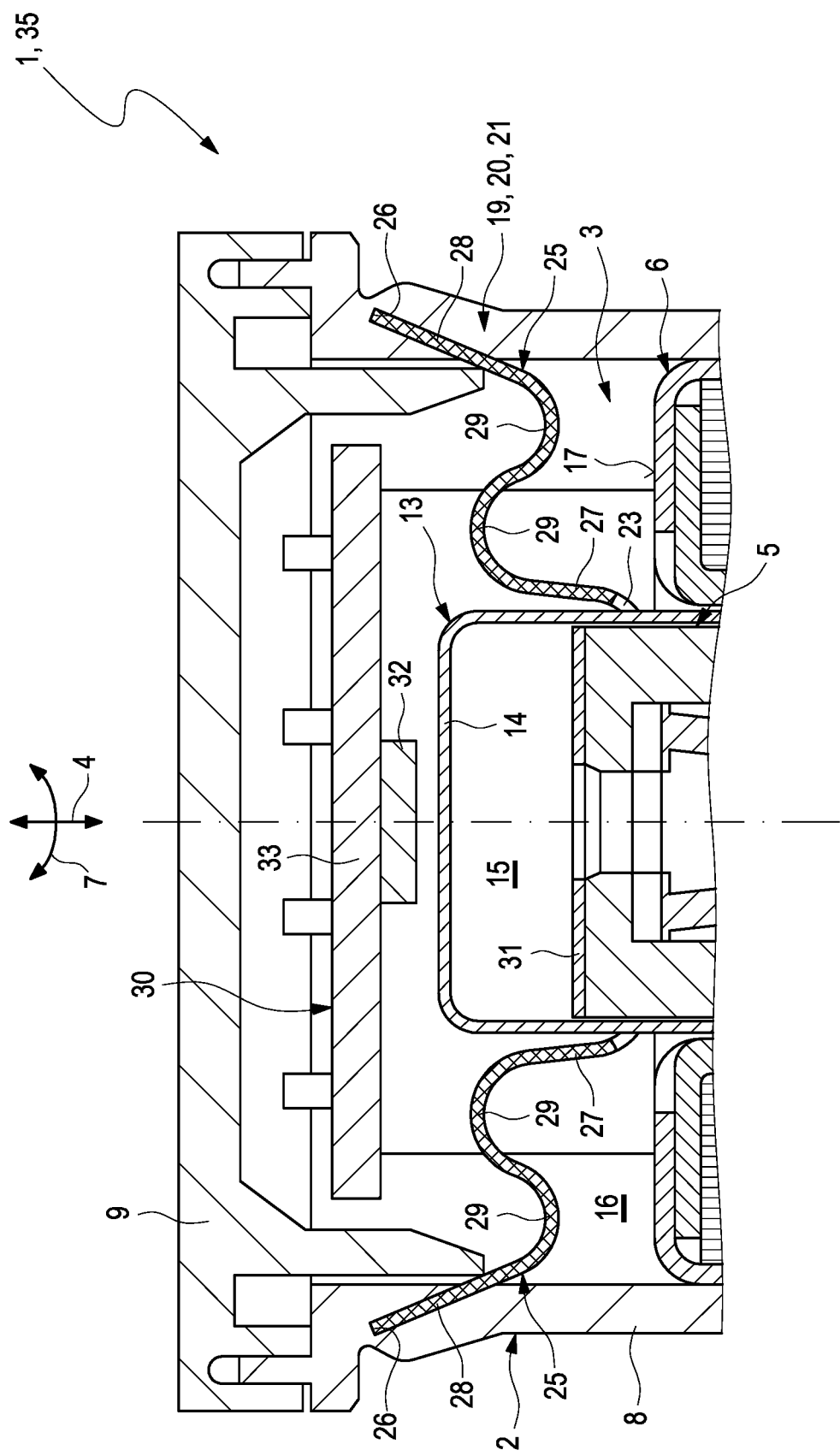
FIG. 2 shows another axial section through a region of the valve.
Figure 3:
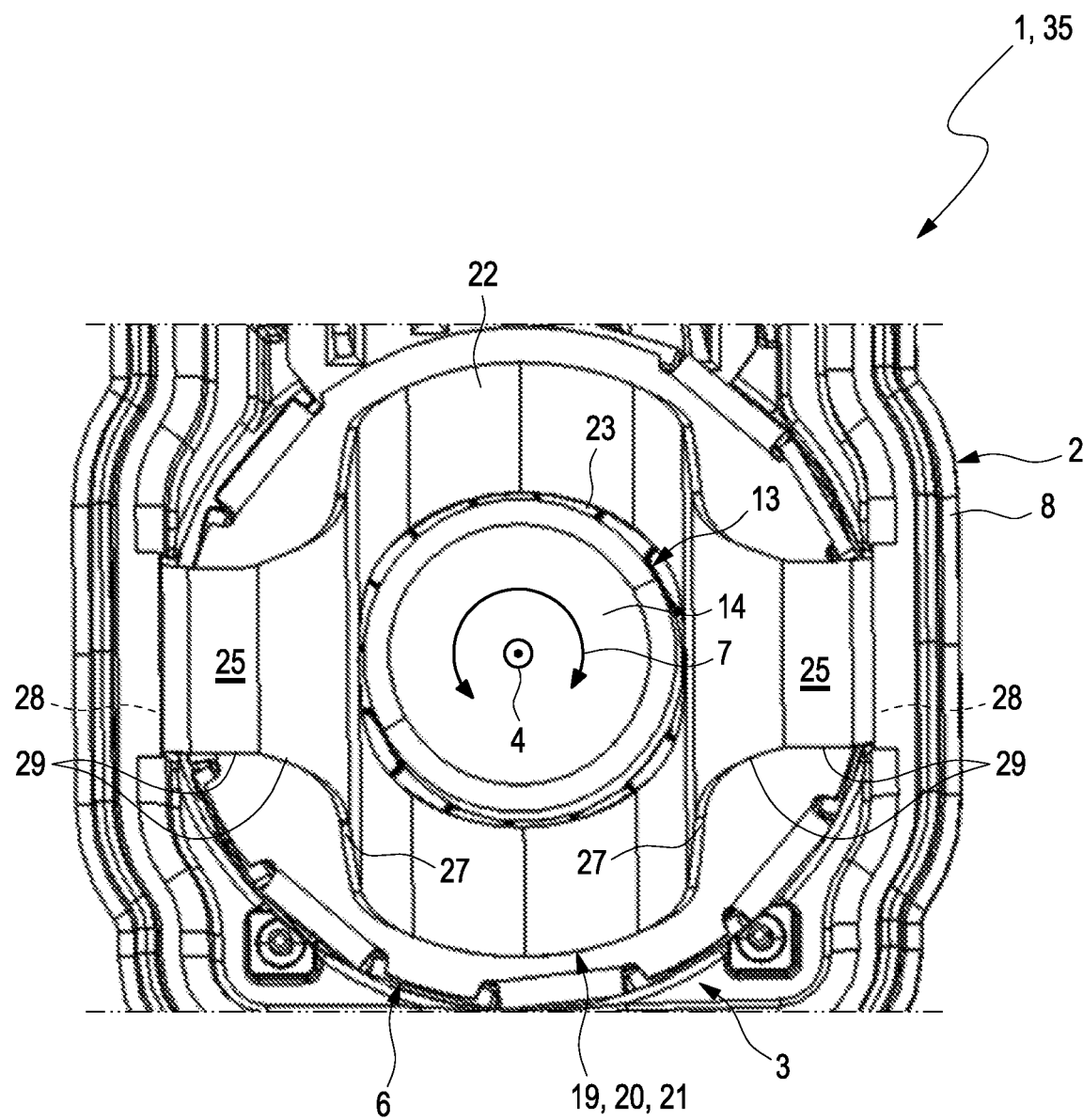
FIG. 3 shows a radial section through the valve.

An electric valve 1, as it is shown, for example, in FIGS. 1 to 3 as well as 6 and 8, is used, for example, in the case of a non-illustrated thermodynamic cycle. In the shown exemplary embodiments, the valve 1 is formed as an electric expansion valve 35 for expanding a fluid. The valve 1 has a housing 2, in which an electric machine 3 is received. The electric machine 3 comprises a rotor 5, which extends in an axial direction 4, as well as a stator 6, which is radially spaced apart from the rotor 5 and which surrounds the rotor 5 in a circumferential direction 7. The directions specified in the present case in each case refer to the axial direction 4, which corresponds to a longitudinal central axis of the rotor 5. Therefore radially runs transversely to the axial direction 4 and the circumferential direction 7 so as to surround the axial direction 4. FIGS. 1 and 2 thereby in each case show an axial section through the valve 1. FIG. 3 shows a radial section through the valve 1.

As can be gathered in particular from FIGS. 1 and 2, the housing 2 comprises a housing pot 8 as well as a housing cover 9, which is axially attached to the housing pot 8 and which closes the housing pot 8. The valve 1 further has a valve body 10, which is drivingly connected to the rotor 5, as well as a valve seat 11, with cooperates with the valve body 10 for expanding the fluid. In the shown exemplary embodiments, the valve body 10 is arranged in a connecting piece 12 of the housing 2, which axially sticks out on the side of the housing pot 8, which axially faces away from the housing cover 9. A split pot 13, which has a pot base 14, on the side, which axially faces the housing cover 9 or which faces away from the connecting piece 12, respectively, is arranged in the housing pot 8. The split pot 13 is arranged approximately centrally in the housing pot 8 and fluidically separates a wet region 15 from a dry region 16 in the housing 2. The wet region 15 is formed within the split pot 13, and the dry region 16 is formed outside of the split pot 13.

FIG. 2 shows an axial section through the valve 1 in the region of the housing cover 9 and of the pot base 14. FIG. 3 shows a radial section through the valve 1 towards the split pot 13, so that the housing cover 9 is not visible. As can be gathered from FIGS. 1 to 3, the stator 6 surrounds the split pot 13 radially on the outside and so as to be closed in the circumferential direction 7. The stator 6 thereby preferably abuts on the split pot 13 radially on the outside. So as not to influence an cooperation of the stator 6 with the rotor 5, if possible, the split pot 13 is advantageously magnetically inactive and/or permeable. As can further be gathered from the figures, the split pot 13 protrudes axially beyond the stator 6 on the side, which axially faces the housing cover 9, so that the split pot 13 protrudes beyond the stator 6 from a front side 17 of the stator 6, which axially faces the housing cover 9.

As can be gathered in particular from the figures, the valve 1 further has a spring assembly 20, which comprises at least one spring 19. The spring assembly 20 is fixed to the housing 2 and rests on the front side 17 of the stator 6, spaced apart from the housing 2, so that the spring assembly 20 mechanically impinges on the stator 6 radially and axially resiliently.

In the shown exemplary embodiments, the spring assembly 2 has a single spring 19, which is made of a sheet metal part, thus formed as a sheet metal spring 21. The spring 19 has a base portion 22, which rests on the front side 17. An opening 23, through which the split pot 13 protrudes axially, is formed in the base portion 22.

In the shown exemplary embodiments, the spring 19 further has two wings 25, which are arranged radially on opposite sides. The respective wing 25 sticks out from the base portion 22 radially on the outside. Along the radial distance direction between the wings 25, the base portion 22 extends over a smaller subregion of the front side 17 than radially transversely to the distance direction in the shown exemplary embodiments, as can in particular be gathered from FIG. 3 and FIG. 6. The respective wing 25 is fixed to the housing 2, so that the fixation of the spring assembly 20 to the housing 2 is realized by means of the wings 25. In the shown exemplary embodiments, the fixation takes place at the housing pot 8. For this purpose, the housing pot 8 for the wings 25 has slots 26, which are open radially on the inside and which run at an incline to the axial direction 4, and in which the wings 25 are arranged spaced apart from the base portion 22.

In the shown exemplary embodiments, the respective wing 25 has a radially inner inner portion 27, which connects to the base portion 22, as well as a radially outer outer portion 28, which is fixed to the housing 2, in the shown exemplary embodiments to the housing pot 8. When installed in the valve 1, the inner portion 27 and the outer portion 28 in each case run so as to be directed away from the front side 17 or towards the housing cover 9, respectively, preferably additionally at an incline to the axial direction 4. As can be gathered in particular from FIG. 2, the respective wing 25 of the shown exemplary embodiments has at least one curved portion 29, which is arranged between the inner portion 27 and the outer portion 28 and which will also be referred to as bending portion 29 below. The inner portion 27 and the outer portion 28 thereby merge into one another via the at least one bending portion 29. In the shown exemplary embodiments and preferably, the respective wing 25 has two bending portions 29 of this type, which follow one another, so that the respective wing 25 has an S-shape in the axial cross section, as can be gathered, for example, from FIG. 2.

A simple, reliable, and precise fixation of the stator 6 in the housing 2 thus takes place by means of the spring assembly 20. The fixation of the stator 6 in the housing 2 is in particular free from screw connections. The production of the valve 1 is simplified in this way. In addition, a reliable and simple compensation of thermally induced displacements takes place, which can occur, for example, during operation of the valve 1, as well as a compensation of age-related displacements within the valve 1, in particular of the housing 2.

Figure 4:
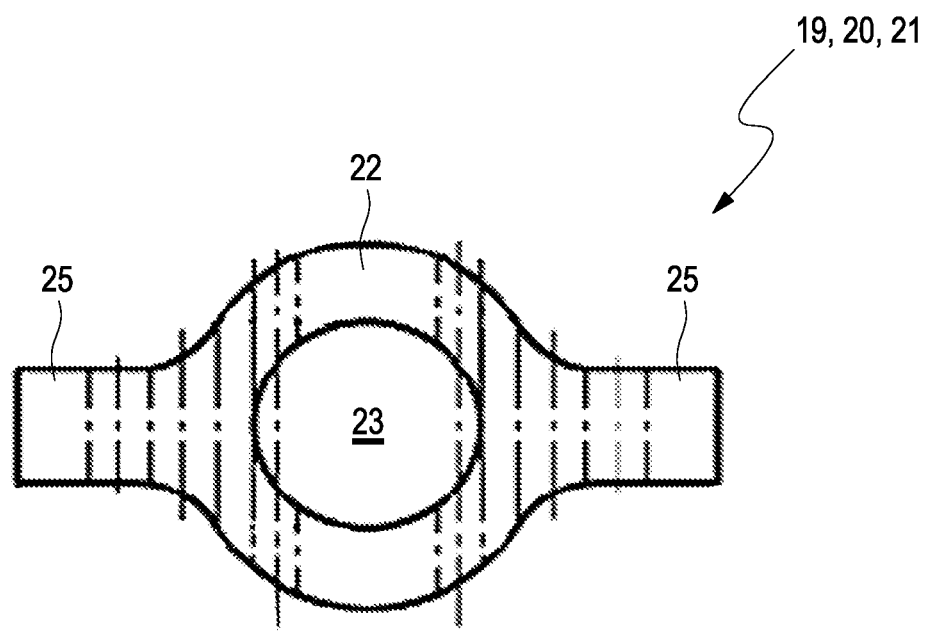
FIG. 4 shows a top view onto a spring assembly of the valve in a first state.
Figure 5:
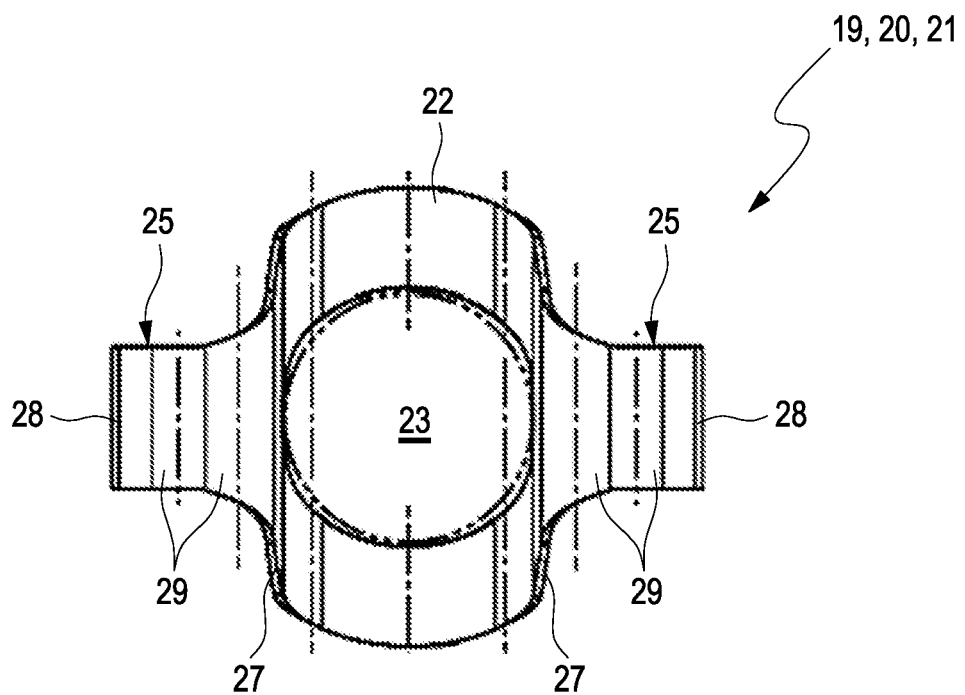
FIG. 5 shows the top view of FIG. 4 in another state of the spring assembly.

As can be gathered from a comparison of FIGS. 4 and 5, the spring assembly 20 and thus the spring 19 is formed in such a way in the shown exemplary embodiments that it has an elliptical opening 23, which is non-round in the shown axial top view, in the untensioned state shown in FIG. 4, that is, in an uninstalled state. As can further be gathered from FIG. 4, the wings 25 stick out from the base portion 22 in a radially flat manner in the untensioned state, thus run in a common plane, which extends radially, with the base portion 22. In response to the insertion of the spring assembly 19 in the valve 1, a corresponding shaping takes place via the wings 25, which results in the shape of the wings 25 shown, for example, in FIGS. 2 and 3, as well as in a shaping of the opening 23 in such a way that the opening 23 is shaped to be round in the top view shown in FIGS. 3 and 5.

As can be gathered, for example, from FIG. 2, the valves 1 of the shown exemplary embodiments have a sensor means 30 for determining a rotational position of the rotor 5 and thus a position of the valve body 10. The sensor means 30 has a permanent magnet 31, which is arranged in the split pot 13 and which is connected in a rotationally fixed manner to the rotor 5, as well as a magnetic sensor 32, which is arranged on the side of the pot base 14, which faces axially away from the pot base 14 of the split pot 13 and which is arranged approximately centrally with respect to the pot base 14 and the permanent magnet 31. In the shown exemplary embodiments, the magnetic sensor 32 is axially spaced apart from the pot base 14. As can be gathered, for example, from FIG. 2, the sensor means 30 further has a printed circuit board 33, which is arranged axially spaced apart from the pot base 14. The magnetic sensor 32 is thereby arranged on the side of the printed circuit board 33, which axially faces the pot base 14, and is attached to the printed circuit board 33. The printed circuit board 33 is fixed in the housing 2. On principle, this can be designed in any way.

Figure 6:
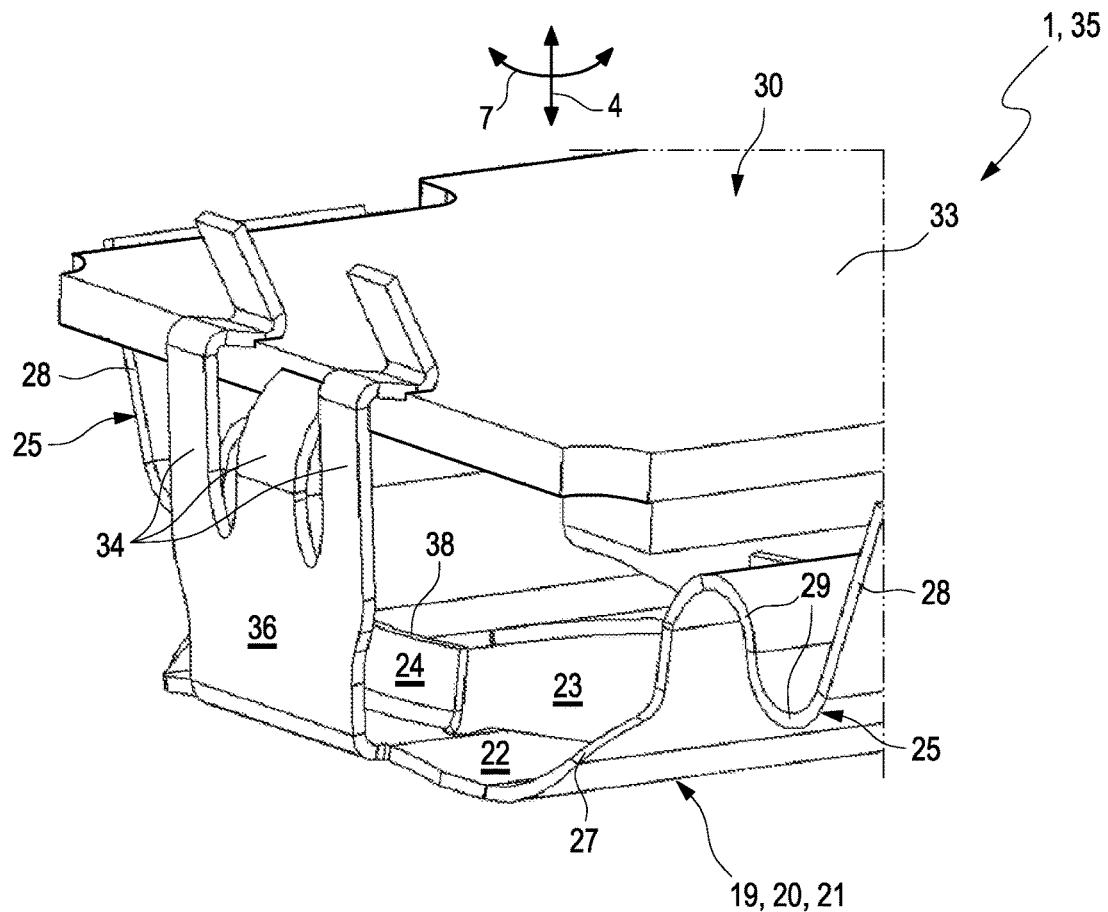
FIG. 6 shows an isometric view of a part of the valve in the case of another exemplary embodiment.
Figure 7:
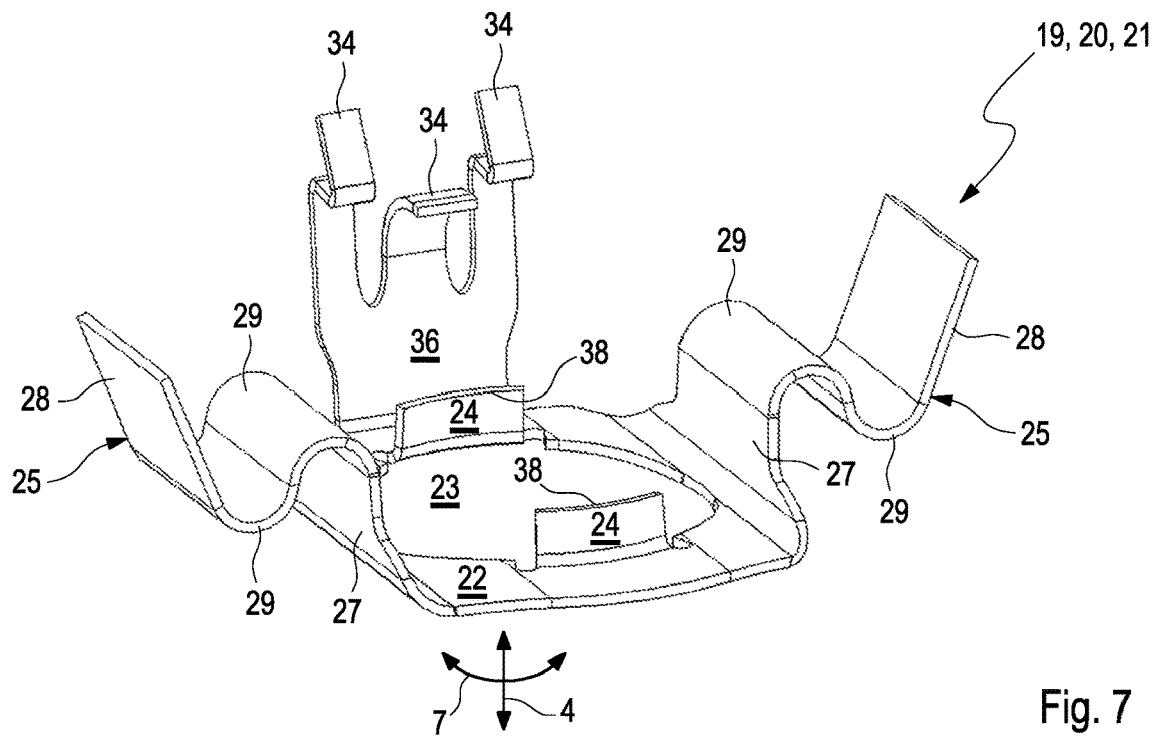
FIG. 7 shows an isometric view of the spring assembly from FIG. 6.

As can be gathered from FIG. 6, the fixation of the printed circuit board 33 in the housing 2 can take place by means of at least one tab 34, which sticks out axially on the side of the spring assembly 20, which faces away from the front side 17, in particular of the base portion 22, and which engages around the printed circuit board 33 on the edge side. For the sake of clarity, FIG. 6 thereby only shows the printed circuit board 33 and the spring assembly 20. FIG. 7 shows an isometric view of the spring assembly 20. The spring assembly 20 of the exemplary embodiment of FIGS. 6 to 8 therefore has three such tabs 34, which are arranged so as to follow one another. The tabs 34 have a common base 36. Radially on the outside of the base portion 22, the base 36 sticks out axially. In the shown exemplary embodiment, the base 36 is thereby arranged in the circumferential direction 7 between the wings 25

The tabs 34 stick out axially from the base 36 and are shaped on their sides, which face away from the base 36, so that two outer ones of the tabs 34 act on the side of the printed circuit board 33, which faces away from the front side 17, and the middle tab 34, which is arranged between the outer tabs 34, acts on the side of the printed circuit board 33, which faces the front side 17. The tabs 34 thus laterally engage around the printed circuit board 33 and fix the printed circuit board 33 in the housing 2. The printed circuit board 33 is tensioned at three different points in this way.

Figure 8:
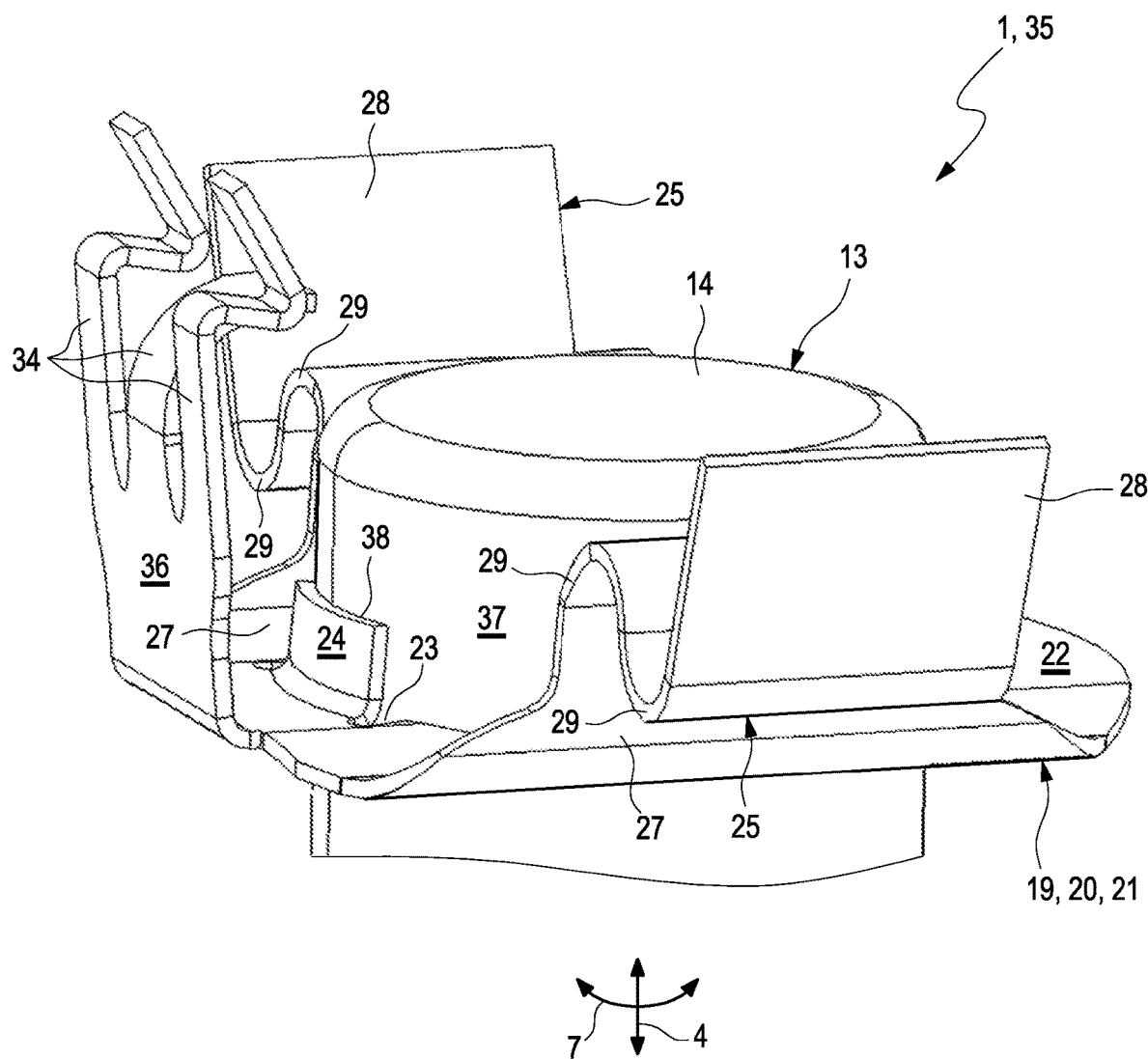
FIG. 8 shows another isometric view of a part of the valve from FIG. 6.

As can be gathered from FIG. 8, the spring assembly 20 can also radially impinge on the split pot 13. In the shown exemplary embodiment, the spring assembly 20 furthermore axially impinges on the split pot 13. For the sake of clarity, only the spring assembly 20 and the split pot 13 are thereby shown in FIG. 8.

To impinge on the split pot 13, the spring assembly 20 has at least one tongue 24 in the shown exemplary embodiment, which sticks out on the side of the base portion 22, which faces away from the front side 17 and which acts on a radial outer sleeve 37 of the split pot 13. Two such tongues 24 are provided in the shown exemplary embodiment, which are arranged so as to be located radially on opposite sides. The respective tongue 24 is thereby spaced apart from the wings 25. In the shown exemplary embodiment, the tongues 24 are arranged in the circumferential direction 7 between the wings 25. One of the tongues 24 is arranged offset radially to the inside to the base 36 and thus to the tabs 34. The tongues 34 thereby adjoin the opening 23. As can be gathered in particular from FIG. 8, the respective tongue 24 runs so as to be inclined radially to the inside, away from the base portion 22. The respective tongue 24 thus acts on the outer sleeve 37 radially resiliently, and therefore impinges radially on the split pot 13. A radially inner edge 38 of the respective tongue 24, which is arranged on the side facing away from the base portion 22, is further directed radially to the inside in this way. The respective edge 38 thereby engages with the outer sleeve 37 and thus forms a positive connection with the outer sleeve 37. The respective tongue 24 thus impinges on the split pot 13 also axially.

The invention claimed is:

1. An electric valve, comprising:
   an electric machine including a rotor and a stator, the stator cooperating with the rotor during operation;
   a valve body drivingly connected to the rotor;
   a valve seat cooperating with the valve body;
   a housing in which the rotor and the stator are arranged;
   a split pot arranged in the housing and fluidically separating a dry region from a wet region in the housing;
   the rotor arranged in the split pot;
   the stator surrounding the split pot radially on an outside in a circumferential direction;
   the split pot protruding beyond an axially outer front side of the stator;
   a spring assembly including at least one spring; and
   wherein the spring assembly is coupled to the housing and rests on the front side of the stator spaced apart from the housing such that the spring assembly mechanically impinges on the stator radially and axially.

2. The valve according to claim 1, wherein the spring assembly has an opening through which the split pot protrudes axially.

3. The valve according to claim 1, wherein:
   the spring assembly further includes a base portion resting on the front side of the stator;
   the spring assembly further includes two wings, which are disposed radially on opposite sides, projecting radially outward from the base portion; and
   the two wings are each coupled to the housing spaced apart from the base portion.

4. The valve according to claim 3, wherein at least one wing of the two wings includes:
   a radially inner inner portion connected to the base portion and directed away from the front side of the stator;
   a radially outer outer portion coupled to the housing and directed away from the front side of the stator; and
   at least one curved bending portion connecting the inner portion and the outer portion.

5. The valve according to claim 4, the at least one wing further includes a second bending portion arranged such that the at least one wing defines an S-shape in an axial cross section.

6. The valve according to claim 3, wherein:
   the spring assembly has an opening through which the split pot protrudes axially; and
   the base portion limits the opening.

7. The valve according to claim 2, wherein:
   when the spring assembly is in an untensioned state, the opening has an elliptical shape in an axial top view; and
   when the spring assembly is in a tensioned state in which the spring assembly is deformed via mechanical tensioning for impinging on the front side of the stator, the opening has a circular shape in the axial top view.

8. The valve according to claim 1, wherein:
   the spring assembly further includes at least one tongue protruding from a side which faces away from the front side of the stator; and
   the at least one tongue mechanically impinges on the split pot radially.

9. The valve according to claim 8, wherein the at least one tongue has an edge which engages an outer sleeve of the split pot.

10. The valve according to claim 1, wherein the spring assembly includes a single spring.

11. The valve according to claim 1, wherein the at least one spring is structured as a sheet metal spring.

12. The valve according to claim 1, wherein:
   the rotor is connected in a rotationally fixed manner to a permanent magnet arranged in the split pot; and
   a magnetic sensor is arranged on a side of the split pot, which axially faces away from the permanent magnet, and is attached to a printed circuit board.

13. The valve according to claim 12, wherein:
the spring assembly further includes at least one tab which laterally engages around the printed circuit board and couples the printed circuit board in the housing; and
the at least one tab protrudes from a side of the spring assembly which faces away from the front side of the stator.

14. The valve according to claim 13, wherein the at least one tab is provided in one piece with the spring assembly.

15. The valve according to claim 8, wherein the at least one tongue further mechanically impinges on the split pot axially.

16. An electric valve, comprising:
an electric machine including a rotor and a stator, the stator cooperating with the rotor during operation;
a valve body drivingly connected to the rotor;
a valve seat cooperating with the valve body;
a housing in which the rotor and the stator are arranged;
a split pot arranged in the housing and fluidically separating a dry region from a wet region in the housing;
the rotor arranged in the split pot;
the stator surrounding the split pot radially on an outside in a circumferential direction;
the split pot protruding beyond an axially outer front side of the stator;
a spring assembly including:
at least one spring;
a base portion resting on the front side of the stator; and
two wings projecting radially outward from opposite sides of the base portion;
wherein a radially outer outer portion of each of the two wings is coupled to the housing such that the spring assembly mechanically impinges on the stator radially and axially.

17. The valve according to claim 16, wherein each wing of the two wings further include:
a radially inner inner portion connected to the base portion and extending away from the front side of the stator; and
a plurality of curved bending portions connecting the inner portion and the outer portion such that the wing defines an S-shape in an axial cross section.

18. The valve according to claim 16, wherein the spring assembly further includes a tongue that mechanically impinges on the split pot radially and axially.

19. The valve according to claim 16, wherein:
the spring assembly further includes an opening through which the split pot protrudes axially;
the opening has an elliptical shape when the spring assembly is in an untensioned state; and
the opening has a circular shape when the spring assembly is in a tensioned state.

20. An electric valve, comprising:
an electric machine including a rotor and a stator, the stator cooperating with the rotor during operation;
a valve body drivingly connected to the rotor;
a valve seat cooperating with the valve body;
a housing in which the rotor and the stator are arranged;
a split pot arranged in the housing and fluidically separating a dry region from a wet region in the housing;
the rotor arranged in the split pot;
the stator surrounding the split pot radially on an outside in a circumferential direction;
the split pot protruding beyond an axially outer front side of the stator;
a spring assembly including at least one spring and an opening, the split pot protruding axially through the opening;
wherein the spring assembly is coupled to the housing and rests on the front side of the stator such that the spring assembly mechanically impinges on the stator radially and axially;
wherein the opening has an elliptical shape when the spring assembly is in an untensioned state; and
wherein the opening has a circular shape when the spring assembly is in a tensioned state.

* * * * *